United States Patent
Utke

(10) Patent No.: US 6,378,812 B1
(45) Date of Patent: Apr. 30, 2002

(54) CABLE ATTACHMENT METHOD AND DEVICE

(75) Inventor: Gene H. Utke, Arcadia, FL (US)

(73) Assignee: Alderon Industries, LLC, Vergas, MN (US)

( * ) Notice: Subject to any disclaimer, the term of this patent is extended or adjusted under 35 U.S.C. 154(b) by 0 days.

(21) Appl. No.: 09/651,339

(22) Filed: Aug. 30, 2000

(51) Int. Cl.⁷ ............................................... F16L 3/22
(52) U.S. Cl. .................. 248/68.1; 248/230.8; 248/219.4
(58) Field of Search .......................... 248/68.1, 634, 248/55, 70, 65, 60, 56, 230.8, 230.1, 218.4, 219.4, 213.2; 174/135, 136, 72

(56) References Cited

U.S. PATENT DOCUMENTS

| | | | | |
|---|---|---|---|---|
| 3,117,371 A | * | 1/1964 | Farley | 29/450 |
| 4,909,462 A | * | 3/1990 | Usui | 248/74.1 |
| 5,215,280 A | * | 6/1993 | Tigrett | 248/68.1 |
| 5,535,787 A | * | 7/1996 | Howell | 138/167 |
| 6,087,593 A | * | 7/2000 | Skipworth et al. | 174/135 |

* cited by examiner

Primary Examiner—Ramon O. Ramirez
Assistant Examiner—A. Joseph Wujciak
(74) Attorney, Agent, or Firm—Dorsey & Whitney LLP

(57) ABSTRACT

The present invention is a cable attachment method and device used with a fastener to secure a cable, hose, or hydraulic line to a rigid member to prevent slippage. The device includes a soft, flexible, cylindrical body having a longitudinal bore configured to accept the fastener. The body has an opening adapted to accept the cable. The body operates to create a high level of friction between the cable and the rigid member and to protect the cable from vibration of the rigid member.

18 Claims, 5 Drawing Sheets

CABLE ATTACHMENT METHOD AND DEVICE

CROSS-REFERENCE TO RELATED APPLICATION(S)

None.

TECHNICAL FIELD

The present invention relates to a system for cable attachment. More particularly, it relates to applications where an electrical cable, hose, or hydraulic line must be attached to a rigid member.

BACKGROUND

A tie wrap is a common way to attach an electrical cable, hose, or hydraulic line to a rigid member, such as a pipe or a structural beam. Most of the electrical cables, hoses, or hydraulic lines have a smooth finish. With a tie wrap alone, it must be fastened extremely tight to prevent movement and slippage of the cable, hose, or hydraulic line. Due to the tightness required to prevent slippage, the tie wrap can cause the cable, hose, or hydraulic line to be badly deformed and can actually damage the cable, hose, or hydraulic line. Many times the attachment is in a wet location or even under water, which increases the chance of slippage. The friction between the cable, hose, or hydraulic line and the rigid member is not great enough to prevent slippage.

Cable attachment devices in the prior art, such as a tie wrap, have another significant shortcoming. The prior art devices lack any vibration damping characteristics, and thus vibration from the rigid member is transferred to the cable, hose, or hydraulic line causing mechanical wear and damage.

There is a need in the art for a device that can increase the friction without over tightening of the fastener (e.g., the tie wrap). There is a need for a device to hold the cable, hose, or hydraulic line in position and provide a high-friction support to eliminate slippage. There is a further need in the art for a device that acts as a shock absorber to minimize vibration damage to the cable, hose, or hydraulic line during operation.

BRIEF SUMMARY

The present invention is a cable attachment method and device used with a fastener to secure a cable, hose, or hydraulic line to a rigid member to prevent slippage. In one embodiment, the device includes a soft, flexible, cylindrical body having a longitudinal bore configured to accept a fastener. The cylindrical body has at least one opening located near a longitudinal midpoint, which is configured to accept and support the cable.

While two embodiments are disclosed, still other embodiments of the present invention will become apparent to those skilled in the art from the following detailed description, wherein is shown and described only the embodiments of the invention, by way of illustration, of the best modes contemplated for carrying out the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1A:
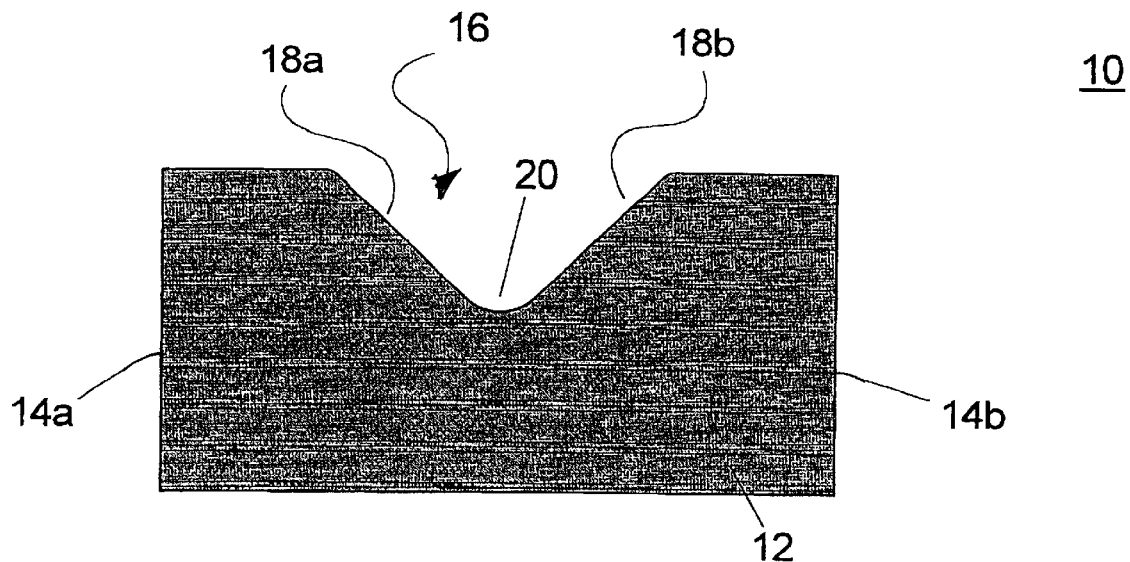
FIG. 1A is a side view of a cable attachment device according to a first embodiment of the present invention.
Figure 1B:
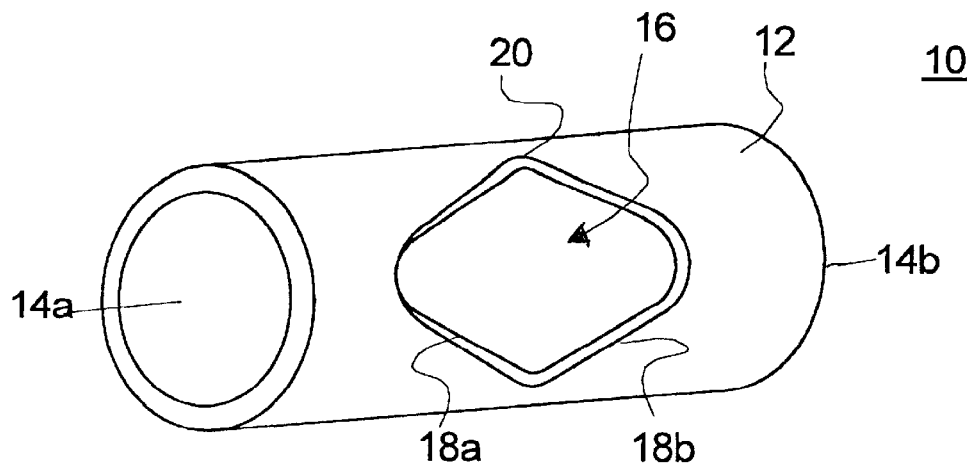
FIG. 1B is a perspective view of a cable attachment device according to a first embodiment of the present invention.

FIG. 1A is a side view and FIG. 1B is a perspective view of a cable attachment device 10 according to a first embodiment of the present invention. As shown in FIGS. 1A and 1B, the cable attachment device 10 includes a body 12 with a proximal opening 14a at a first end and a distal opening 14b at a second end. The proximal opening 14a and the distal opening 14b are connected by a longitudinal bore. In one embodiment, the body 12 has a lateral cross-section that is cylindrical in shape. In another embodiment, the lateral cross-section is square-shaped. In another embodiment, the lateral cross-section is triangular-shaped. The body 12 includes a notch 16 formed between the proximal opening 14a and the distal opening 14b. In one embodiment, the opening is formed near a longitudinal center of the body 12. In one embodiment, the notch 16 is generally cut in the shape of a "V," and forms an opening in a wall of the body 12. The edges of the notch 16 include a first side 18a and a second side 18b, which meet at an intersection 20.

In one embodiment, the body 12 is made from a soft, rubber-like material. In one embodiment, the body 12 is made from rubber. In another embodiment, the body 12 is made from a polymeric material. In a further embodiment, the body 12 is made from any material, known to those of ordinary skill in the art, that has a coefficient of friction sufficiently great to minimize slippage between the body 12 and the rigid member.

Figure 2:
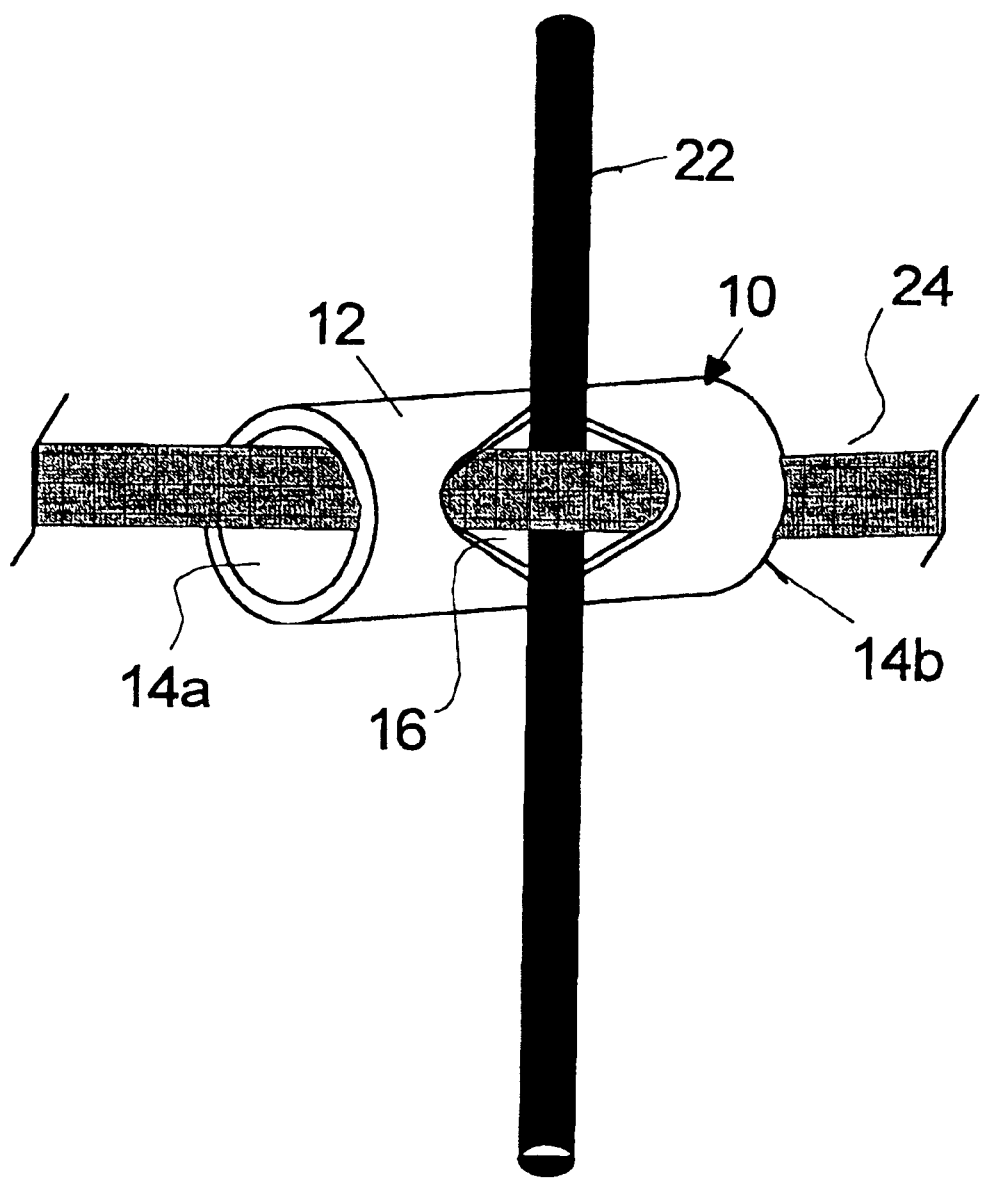
FIG. 2 is a perspective view of the cable attachment device of FIG. 1A with a cable and a fastener.
Figure 3:
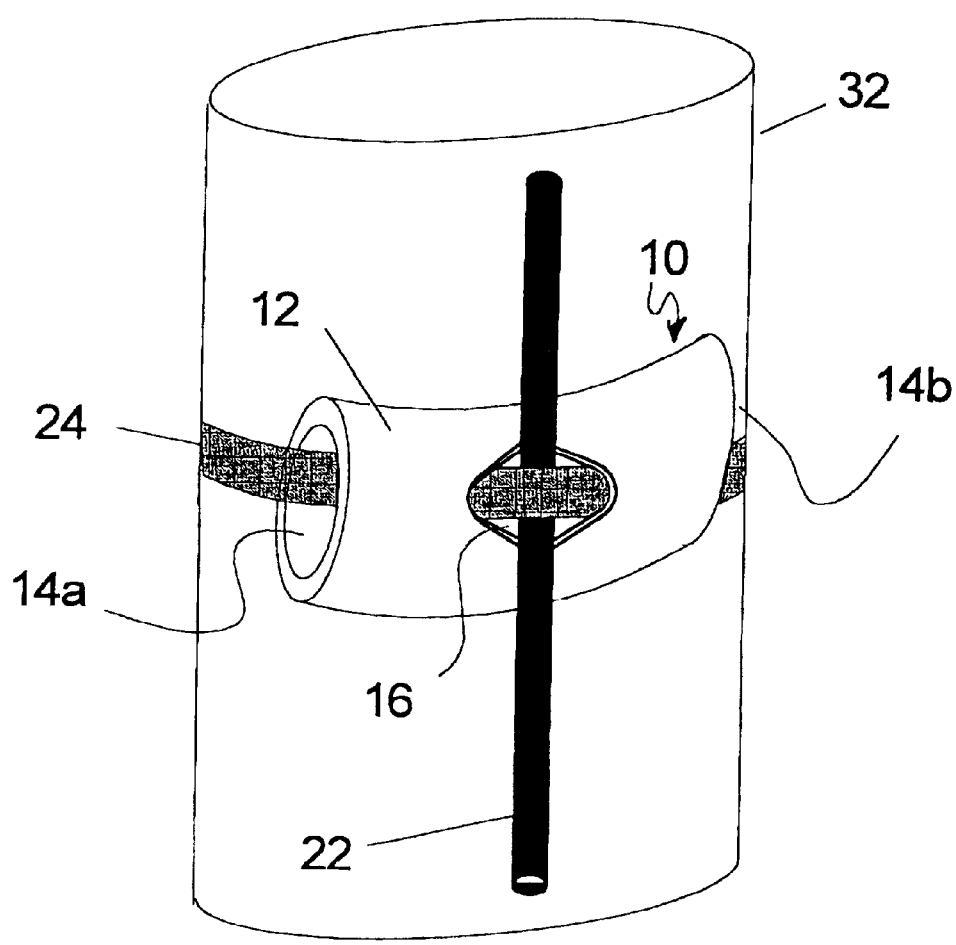
FIG. 3 is a perspective view of the cable attachment device of FIG. 1A, in operation.

FIG. 2 shows a perspective view of the cable attachment device 10, along with a cable 22 and a fastener 24. In various embodiments of the present invention, the cable 22 is a support cable, an electrical cable, a hose, or a hydraulic line. In one embodiment of the present invention, the fastener 24 is a tie wrap. The unique shape of the cable attachment device 10 provides several functions. The notch 16 keeps the cable 22 in line with a rigid member (as shown in FIG. 3) that the cable 22 is being mounted to. The notch 16 provides an open area in the body 12 where the fastener 24 can pass over a surface of the cable 22 facing away from the rigid member. The generally "V"shape of the notch 16 allows the fastener 24 to be readily manipulated through the openings 14a, 14b and around the cable 22. This design also makes it possible to install the cable attachment device 10 to an existing cable 22.

The size and design of the opening of the notch 16 is important as it holds the cable attachment device 10 in position on the cable 22 when the fastener 24 is inserted through the body 12. The cable attachment device 10 is also held in place by the frictional forces between the body 12, the cable 22, and the rigid member. This allows the cable attachment device 10 to be installed at a pre-measured location on the cable 22 and to remain in that location even when the fastener 24 is not fastened.

A cable attachment method 30 is illustrated in FIG. 3. As shown in FIG. 3, the cable attachment device 10 is used, with the fastener 24, to secure the cable 22 to a rigid member 32. As shown, the fastener 24 enters the proximal opening 14a, exits the notch 16, before the cable 22, passes over the top of the cable 22, enters the body 12 through the notch 16, on the other side of the cable 22, and exits the distal opening 14b. The fastener 24 is then tightened. The body 12 of the cable attachment device 10 is made of a soft rubber-like material that will flex and bend to conform to the surface of the rigid member 32. This will provide maximum surface are contact between the cable attachment device 10 and the rigid member 32, and thus maximum friction to prevent slippage. The soft, rubber-like material of the body 12 will also conform to any irregularities in the shape of the cable 22 and thus will maintain maximum friction to prevent slippage. The physical characteristics of the body 12 will also act to dampen any vibration in the rigid member 32, and prevent the vibration from reaching and damaging the cable 22.

Figure 4:
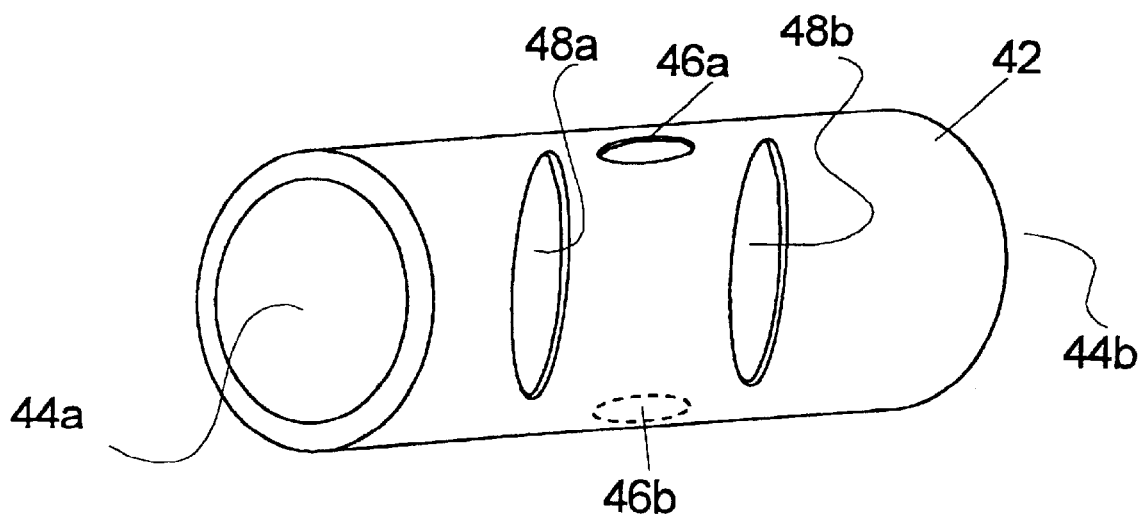
FIG. 4 is a perspective view of a cable attachment device according to a second embodiment of the present invention.

FIG. 4 is a perspective view of a cable attachment device 40 according to a second embodiment of the present invention. As shown in FIG. 4, the cable attachment device 10 includes a body 42 that is cylindrical in shape with a proximal opening 44a at a first end and a distal opening 44b at a second end. The body 42 includes a first cable opening 46a and a second cable opening 46b configured for insertion of the cable 22. The body 42 further includes a first fastener opening 48a and a second fastener opening 48b configured for insertion of the fastener 24. The body 12 is made from a soft, rubber-like material.

Figure 5:
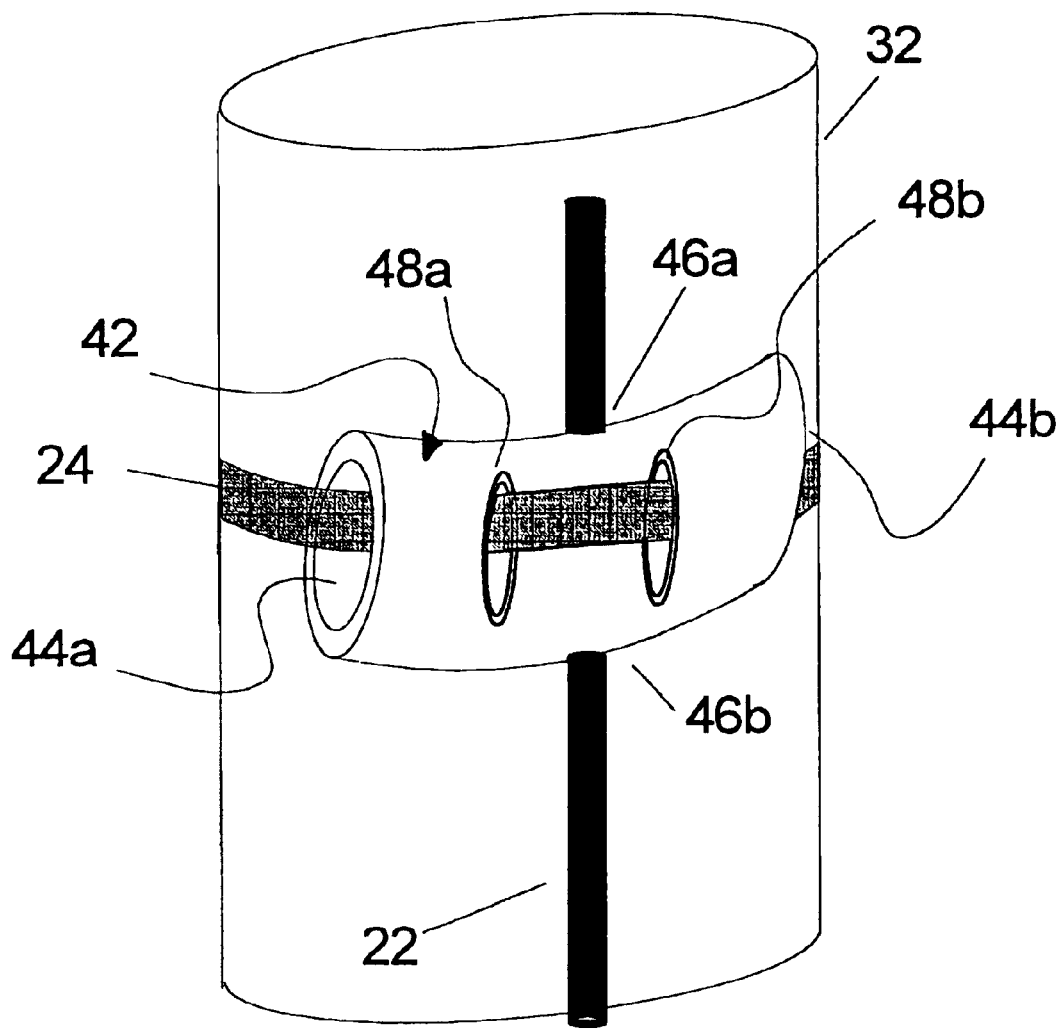
FIG. 5 is a perspective view of the cable attachment device of FIG. 4, in operation.

FIG. 5 is a perspective drawing of a cable attachment method 50. As shown in FIG. 5, the cable attachment device 40 is used, with the fastener 24, to secure the cable 22 to the rigid member 32. As shown, the cable 22 is threaded through the cable openings 46a, 46b, such that it is in line with the rigid member 32. The fastener 24 enters the proximal opening 44a, exits the first fastener opening 48a, passes over the top of the cable 22, which is located inside the body 12, reenters the body 12 through the second fastener opening 48b, and exits the distal opening 44b. The fastener 24 is then tightened. The body 42 of the cable attachment device 10 is made of a soft rubber-like material that will flex and bend to conform to the rigid member 32. This will provide maximum surface are contact between the cable attachment device 40 and the rigid member 32, and thus maximum friction to prevent slippage. The soft, rubber-like material of the body 12 will also conform to any irregularities in the shape of the cable 22 and thus will maintain maximum friction to prevent slippage. The physical characteristics of the body 12 will also act to dampen any vibration in the rigid member 32, and prevent the vibration from reaching and damaging the cable 22.

The cable attachment method 50 also addresses a technique for protecting the cable 22 from being damaged by fasteners 24 that have sharp edges. In this embodiment, the fastener 24 tightens against the body 42 of the cable attachment device 50 and thus eliminates direct contact between the fastener 24 and the cable 22, which serves to protect the cable 22 from damage.

Although the present invention has been described with reference to preferred embodiments, persons skilled in the art will recognize that changes may be made in form and detail without departing from the spirit and scope of the invention.

I claim:

1. A device for securing a cable to a rigid structure, the device comprising:
    a fastener;
    a body having a longitudinal bore therethrough configured to accept the fastener;
    wherein the body has at least one opening therein configured to accept and support the cable by extending the fastener through the opening and over the cable.

2. The device of claim 1 wherein the at least one opening is a diamond-shaped notch.

3. The device of claim 1 wherein the at least one opening includes a top opening and a bottom opening configured to accept the cable, and a first opening and a second opening configured to accept the fastener.

4. The device of claim 3 wherein the first opening and the second opening are oval-shaped and extend laterally across the cylindrical body.

5. The device of claim 3 wherein the top opening and the bottom opening are located near a longitudinal midpoint of the cylindrical body, and the first opening and the second opening are located between an end of the cylindrical bore and the longitudinal midpoint.

6. The device of claim 1 wherein the cylindrical body has a coefficient of friction and damping characteristics similar to rubber.

7. The device of claim 1 wherein the body is made of a material that has a coefficient of friction sufficient to substantially eliminate slippage between the body and the rigid structure.

8. The device of claim 1 wherein the cylindrical body is made from rubber.

9. A device for securing a cable to a rigid structure, the device comprising:
    a cylindrical body having a proximal opening and a distal opening connected by a longitudinal bore, the cylindrical body having a notch located near a longitudinal midpoint; and
    a fastener sized to pass through the longitudinal bore of the cylindrical body and around a perimeter of the rigid structure, the fastener having sufficient flexibility to conform to an outer surface of the rigid structure;
    wherein the notch is configured to accept the cable by allowing the fastener to exit and reenter the cylindrical body such that the fastener extends over the cable.

10. The device of claim 9 wherein the cylindrical body is made from a rubber material.

11. The device of claim 9 wherein the notch in the cylindrical body is generally diamond-shaped.

12. The device of claim 9 wherein the notch includes two lateral corners and two longitudinal corners.

13. The device of claim 12 wherein the two lateral corners are generally curved such that the radius of curvature is approximately the same as a radius of curvature of an outer surface of the cable.

14. The device of claim 9 wherein the cylindrical body includes a longitudinal bore therethrough, the bore having a diameter of about three times a width of the fastener.

15. A method of securing a cable to a rigid structure using a fastener, the method comprising:
    extending the fastener through a body having a longitudinal bore and contacting the fastener to the cable by allowing the fastener to exit and reenter the cylindrical body through an opening in the body such that the fastener extends over the cable;

wherein the body is constructed from a material having a coefficient of friction sufficient to eliminate slippage between the rigid structure and the body.

16. The method of claim 15 wherein the body has a cylindrical cross-section and is made from a rubber-like material.

17. The method of claim 15 wherein the material has a coefficient of friction of at least that of rubber.

18. A method of attaching a cable to a rigid structure, the method comprising:

placing a soft, flexible, cylindrical body between the rigid structure and the cable;

threading a fastener through the cylindrical body, such that it extends over a lateral surface of the cable by allowing the fastener to exit and reenter the cylindrical body through an opening in the body; and securing the fastener to the rigid body.

\* \* \* \* \*